United States Patent [19]

Bader

[11] Patent Number: 5,336,043

[45] Date of Patent: Aug. 9, 1994

[54] METHOD AND APPARATUS FOR HANDLING STACKED PRODUCTS

[76] Inventor: Bernard R. Bader, 6802 Bristol Way, Yakima, Wash. 98908

[21] Appl. No.: 832,447

[22] Filed: Feb. 7, 1992

[51] Int. Cl.$^5$ ............................................. B65G 47/26
[52] U.S. Cl. ................................. 414/796; 198/429; 414/786; 414/797.9; 414/798.9
[58] Field of Search ............... 198/429; 414/795.6, 414/796, 796.1, 797.9, 786, 798.9; 53/532

[56] References Cited

U.S. PATENT DOCUMENTS

| | | | |
|---|---|---|---|
| 3,491,633 | 1/1970 | White | 414/798.9 X |
| 4,522,294 | 6/1985 | Walz | 414/798.9 X |
| 4,610,346 | 9/1986 | Phillipson | 414/798.9 X |
| 4,869,359 | 9/1989 | Müller et al. | 414/798.9 X |
| 5,095,684 | 3/1992 | Walker et al. | 53/532 X |

Primary Examiner—Michael S. Huppert
Assistant Examiner—Janice Krizek
Attorney, Agent, or Firm—Stratton Ballew Richardson

[57] ABSTRACT

A method and apparatus for handling stacked and/or nested products in a product line using a counter separator system, a counter device, a motive system, and a separator device is disclosed. Product to be handled is produced and moved along at least one elongated channel. When a predetermined number of products in the product line have passed the fixed reference point, the counter device triggers the motive system, which moves the separator device forward, physically separating a predetermined number of product away from the product line, creating a counted unit.

6 Claims, 9 Drawing Sheets

METHOD AND APPARATUS FOR HANDLING STACKED PRODUCTS

TECHNICAL FIELD

This invention relates to a method and apparatus for handling stacked and/or nested products. More particularly, both the method and apparatus of this invention relate to counting stacked and/or nested products in a product line and separating the counted products into counted units so that they can be packaged.

BACKGROUND OF THE INVENTION

With modern production methods, there is great need to be able to handle large numbers of stacked and/or nested products in an automated fashion. The term "nested" is used in this patent application to designate stacked products that have raised lips or edges, so that when the products are placed in a line, the lip or edge of a first product will overlap the bottom of a second product in front of the first product. For the rest of this patent application the term "stacked product" shall mean stacked and/or nested product.

The handling of stacked products includes the need to count products, separate the products into some sort of counted units that have a predetermined number of product in them and arrange for packaging or actually package the products, all while keeping the products organized in some fashion.

Typical examples of stacked products are food oriented products such as trays, plates, and cups. These products can be made of polystyrene and other plastics, paper, aluminum, or any other materials that have the desired combination of strength, weight, and cost. A typical product, such as a meat tray, can be produced by a press machine which stamps it from sheets of polystyrene material. The formed products are output from the press machine in one or more product lines of stacked products. In effect, the product line is an endless, self-replenishing stack of products with each product nested between the products on either side of it. Most frequently, the products themselves are oriented so that they are each resting on one edge, and the product line itself is substantially horizontal.

Handling stacked products in a product line as described in the above paragraph presents a number of problems. First, simply counting the products is a problem. Existing methods of counting products to obtain the desired number of products in a counted unit have proved to be unreliable, in that they tend to vary from the desired or predetermined number of products in the counted unit. The existing methods and apparatuses for counting stacked products have included attempts to count the products by the length of the product line or to count individual products in the product line using optical scanning or mechanical methods to count the individual products as the product line passes the scanner or mechanical counting device.

The methods and apparatuses described above require a high degree of uniformity in the size and shape of the products and in the stacking density of the product line to be successful in providing an accurate and reliable count of stacked products in the product line. The stacking density of the product line is the number of products per unit length in the product line. With most manufacturing machines and methods, there is a certain amount of variation in the size and shape of the products as they are produced, such as variation in the product thickness. In addition, this variation in size and shape can affect the nesting of the stacked product which, in turn, can vary the distance between the stacked products in the product line. Environmental factors, such as temperature and humidity, also can affect the stacked products and the stacking density in the product line.

Another problem with existing methods and apparatuses for counting stacked products is that the existing methods and apparatuses frequently have an accumulated error due to variations in manufacturing processes and in stacking density of the product lines. An accumulation of error results from the process of counting, be it electrical, optical, or mechanical, which can cause errors in the count to be repeated or even magnified. Accumulated errors can come from optical misreads with optical systems. Errors in electrical counting systems may come from varying voltages which change calibrations, or temperature and humidity causing variations in electrical components which also can cause changed calibrations.

Just as variations in the manufacturing process and changes in environmental factors can cause problems in counting the product, they also can cause problems in the separation and handling of the counted units. Most existing methods and apparatuses for separating products in the product line also require a high degree of uniformity in product size and shape, and in stacking density in the product line. Variations in the location of a product edge in the product line, thickness of the product, or distance between two products in the product line also can cause an incorrect number of products to be separated into the product unit. These variations in the product, product line, and product density also can cause physical jamming of the handling apparatus.

As illustrated by the above discussion there are a number of desirable features for a method or apparatus for handling stacked products in a product line. It would be desirable to have an apparatus for handling stacked products in a product line that would consistently count the stacked product in the product line correctly. It also would be desirable to have an apparatus that could provide consistent counts of stacked products in a product line despite variations in manufacturing process or environmental factors. In addition, it would be desirable to have an apparatus that could provide consistent counts of stacked products without accumulating errors from earlier counts. Further, it would be desirable to have an apparatus for handling stacked products in a product line that would separate the stacked products into counted units containing predetermined numbers of the stacked products. In addition, it would be desirable to have a method for handling stacked products in a product line which could consistently count the stacked products in a product line, and separate those products into counted units with a predetermined number of products in them, despite variations in manufacturing processes or environmental factors.

While the discussion herein relates to methods and apparatuses for handling stacked and/or nested products in a product line, it is not intended that the invention be limited to this situation. It will be obvious from the description that follows that the present invention will be useful in other applications with problems common to those described herein.

DISCLOSURE OF THE INVENTION

It is an object of the present invention to provide an apparatus for handling stacked products in a product line that will consistently count the stacked products correctly.

It is also an object of the present invention to provide an apparatus that will consistently count stacked products correctly despite variations in manufacturing processes or environmental factors.

It is an additional object of the present invention to provide an apparatus for handling stacked products in a product line that will consistently count stacked products in a product line without accumulating errors from earlier counts.

It is a further object of the present invention to provide an apparatus for handling stacked products in a product line that will consistently separate the stacked products into counted units containing predetermined numbers of the stacked products.

It is yet another object of the present invention to provide an apparatus for handling stacked products in a product line that can count and separate the stacked products whether the product line is substantially horizontally or vertically oriented.

It also is an object of the present invention to provide a method for handling stacked products which allows stacked products to be consistently counted correctly.

It is a further object of the present invention to provide a method which allows stacked products to be consistently counted correctly despite variations in manufacturing processes or environmental factors.

It is an additional object of the present invention to provide a method for handling stacked products in a product line that allows the stacked products to be separated into counted units containing predetermined numbers of the stacked products.

The present invention achieves these and other objectives which will become apparent from the description that follows, by providing an apparatus for handling stacked products in a :product line that can consistently and reliably count the stacked products in the product line, and separate them into counted units containing predetermined number of products.

In a preferred embodiment of the invention, the handling apparatus includes at least one elongated channel along which the product line passes. The elongated channel has sides, a bottom, and a length. There is at least one elongated slot in one side or the bottom of the channel. The elongated slot extends substantially along the length of the elongated channel.

The preferred embodiment also has a counter-separator system which counts the number of stacked products passing a fixed reference point in the elongated channel based on a count received from the source of the products in the product line. When a predetermined number of stacked products have been counted, the counter-separator physically separates those products into a counted unit, pushing the counted unit along the channel away from the product line to the desired disposal of the counted unit.

In another preferred embodiment of the present invention an apparatus for handling stacked products in a product line is provided that is essentially identical to the above preferred embodiment. In this embodiment, the counter-separator system includes a counter device which receives a count from the source of the products in the product line, and in turn triggers a motive system which is attached to a separator device. The separator device physically separates the predetermined number of products into a counted unit.

In another alternative preferred embodiment of the present invention, the separator device is at least one finger. Each finger curves from its connection with the motive system through the elongated slot into the elongated channel. The finger curves upward and has an upper end that rests against the edges of the stacked products in the product line. When each finger is pushed forward, the upper end is inserted between stacked products in the product line, moving forward to separate the counted unit from the product line.

A further alternative preferred embodiment of the present invention also has a separator with at least one finger. In this embodiment, the finger has a rocker arm, a pivot, a spring at a first end of the rocker arm, and a stylus projecting upward from a second end of the rocker arm. The spring pressing the first end of the rocker arm forces the stylus upward at the rocker arm second end against the edges of the stacked products in the product line.

An additional alternative preferred embodiment of the present invention is substantially identical to the embodiments described above, but when the motive system is triggered to move the separator forward to form a counted unit, the finger is moved forward a short distance. The motive system then halts the forward motion of the finger and returns the finger to its rest position. This "stutter step" allows a gap to form between the last stacked product in the counted unit being formed and the first stacked product in the product line. After the finger has been returned to its rest position, the motive system again pushes the finger forward into the gap and moves the finger and the stacked products forward to complete the separation of the stacked products from the product line to create the counted unit.

In another alternative preferred embodiment, an apparatus for handling stacked products in a product line is provided which is used to count and separate products in a product line that has a substantially vertical orientation. Like the above embodiments, the apparatus in this embodiment has at least one channel, but this channel is oriented so that its longitudinal axis is substantially vertical. This embodiment also uses an elongated slot through one of the sides of the channel, and a counter-separator system having a counter device, a motive system and at least one finger that is attached to the motive system and curves through the elongated slot into the channel. In this preferred embodiment, the channel has sufficient structure to maintain the organization of the stacked products and when the counted units are to be created, the finger is inserted and raises the stacked products in the counted unit upward.

A further preferred embodiment of the present invention provides a method for handling stacked products in a product line. The method in this preferred embodiment involves the steps of counting the stacked products as they are being produced, and accumulating the product count until the product count reaches a predetermined number. When the predetermined number is reached, inserting a separator device into the product line and separating a predetermined number of stacked products from the product line by moving the separator device forward and creating a counted unit. Finally, separator device returns to its rest position.

An additional preferred embodiment of the present invention uses a method similar to methods described in the above embodiment, but has several additional steps. In this embodiment, after initially moving the separator device forward against the predetermined number of stacked products, the separator device is stopped after a short distance and returned to its original rest position. This step is repeated to assure proper separation of the stacked products.

DETAILED DESCRIPTION OF PREFERRED EMBODIMENTS

Figure 1:
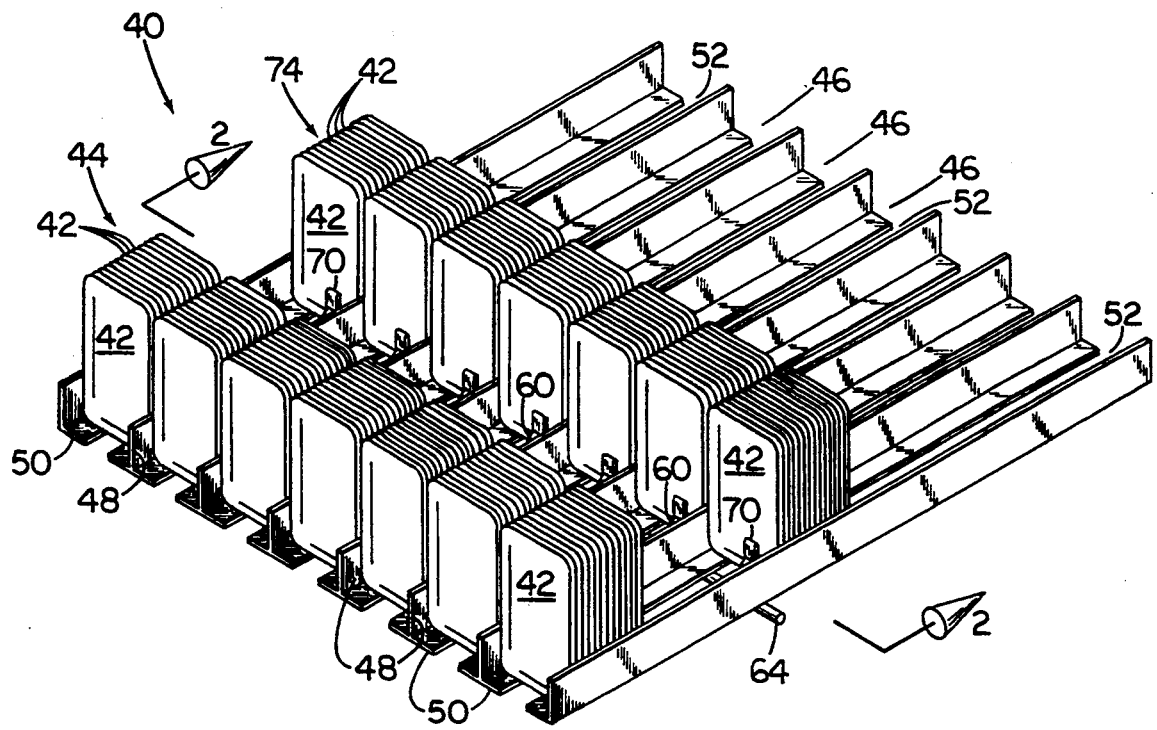
FIG. 1 is a perspective view of a preferred embodiment constructed in accordance with the present invention.
Figure 2:
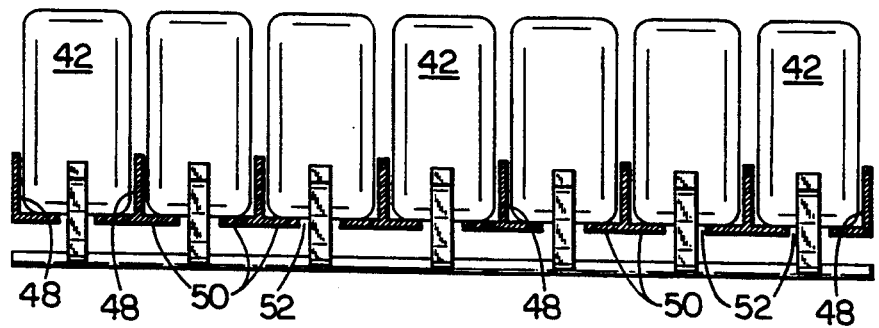
FIG. 2 is a side cross section view of a preferred embodiment constructed in accordance with the present invention taken along lines 2—2 in FIG. 1.
Figure 1A:
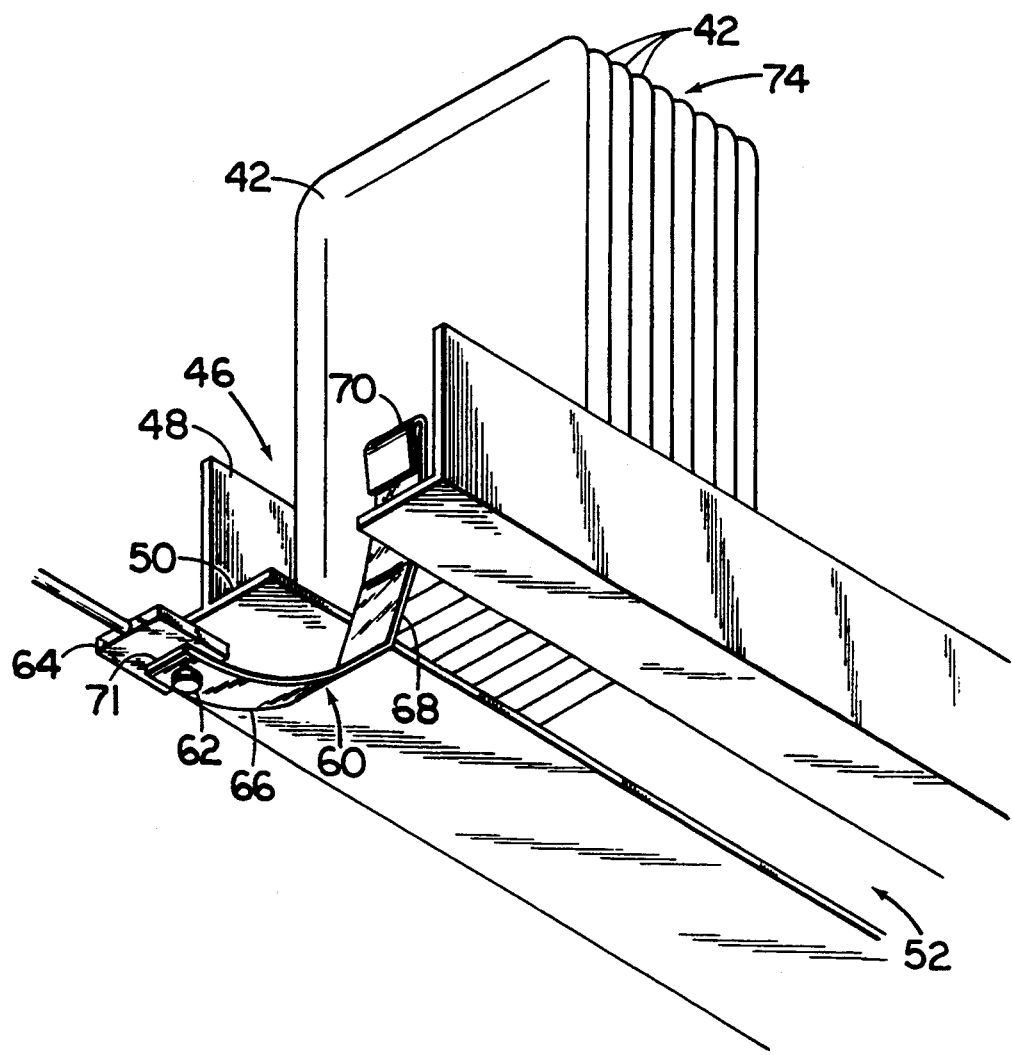
FIG. 1A is a partial, bottom perspective view of a preferred embodiment constructed in accordance with the present invention.
Figure 3:
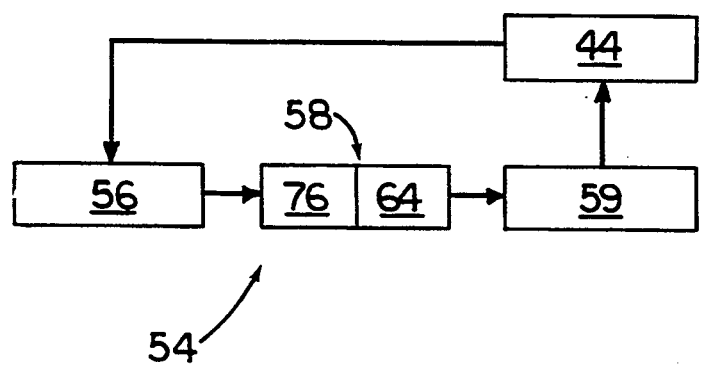
FIG. 3 is a block diagram of a preferred embodiment constructed in accordance with the present invention, showing the operation of the preferred embodiment.

With reference to FIGS. 1–3, an apparatus 40 for handling stacked products 42 in a product line 44 is shown. The apparatus has a plurality of elongated channels 46 with each channel having sides 48 and a bottom 50. At the bottom of each channel, there is an elongated slot 52 that extends substantially along the length of the channel. This is best illustrated in FIGS. 1 and 1A.

Figure 7:
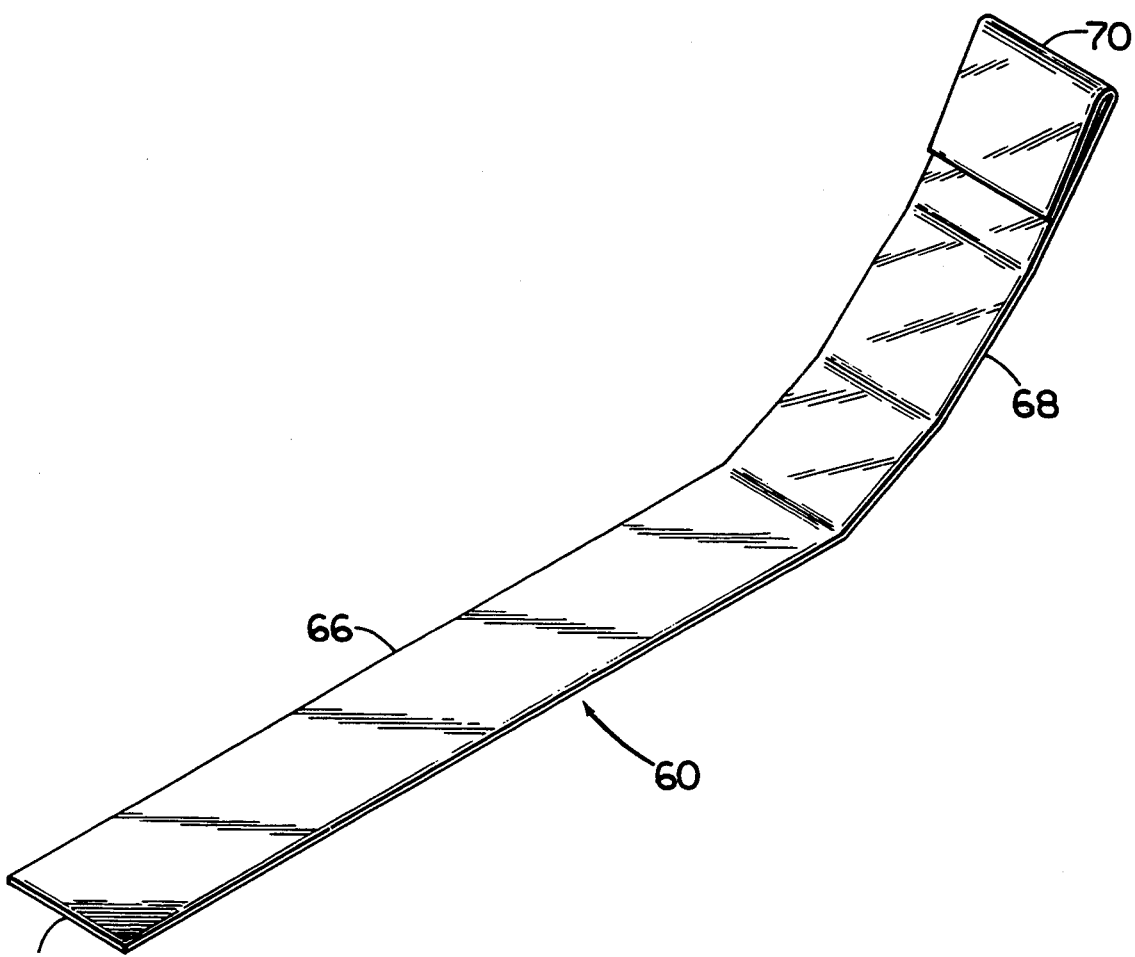
FIG. 7 is a perspective view of a finger as used in several of the preferred embodiments constructed in accordance with the present invention.

The apparatus also has a counter-separator system 54. The primary components of the counter-separator system are the counter device 56, the motive system 58, and a separator device 59, in this case a plurality of curved fingers 60 which are attached to the motive system. In this embodiment, at least one finger for each elongated slot is attached to the motive system. The attachment is achieved by one anchor point 62 for each finger that affixes the finger base end 71 to the motivation bar 64. Each finger has a base section 66 and a curved section 68 which curves upward and ends in an upper end 70 as shown in FIG. 7. The upper end of the finger extends through the corresponding elongated slot 52 into the elongated channel 46.

In this particular embodiment, stacked products 42 are fed into the elongated channels 46 from a press machine. Each time the press machine stamps out a product to be added to the product line, a count is sent from the press machine to the counter device 56. The counter device accumulates the count of the produced stacked products and compares it to a predetermined number that is to be used to create a counted unit 74. When the accumulated count from the counter device is equal to the predetermined number, the motive system 58 is triggered. The resting position of the finger upper end 70 constitutes a fixed reference point 78.

The motive system includes a power source 76 which provides the motive power to move the motivation bar 64 and any attached fingers 60. Pneumatic, electric and hydraulic power have been used for the power source as well as others.

Figure 4A:
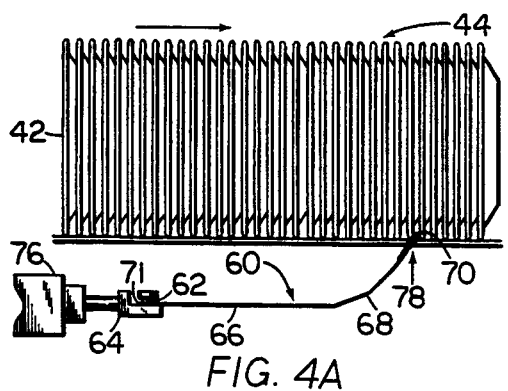
FIGS. 4A–4H are a series of partial side cross section views of a preferred embodiment constructed in accordance with the present invention, illustrating in part the actions of the motive system.
Figure 4B:
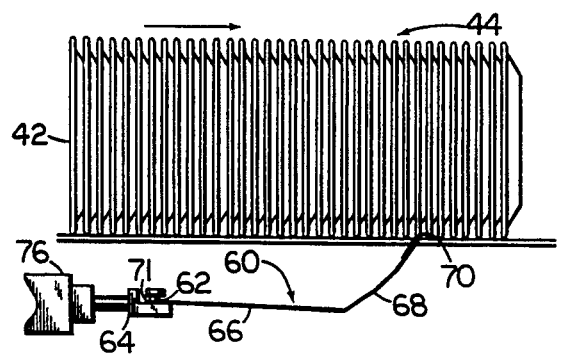
Figure 4C:
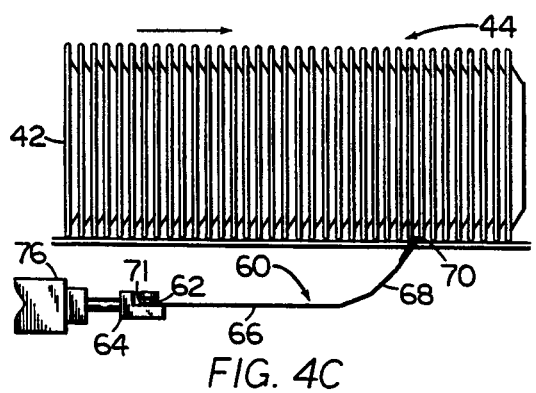
Figure 4D:
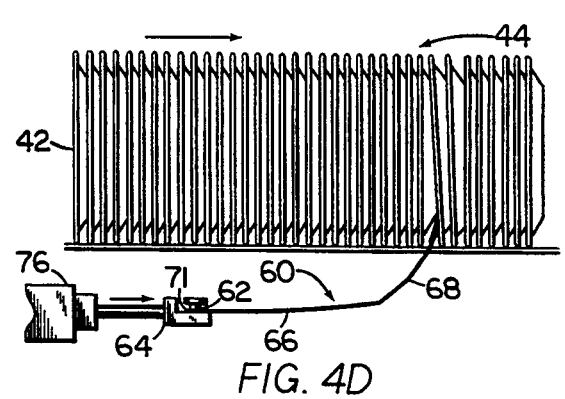
Figure 4E:
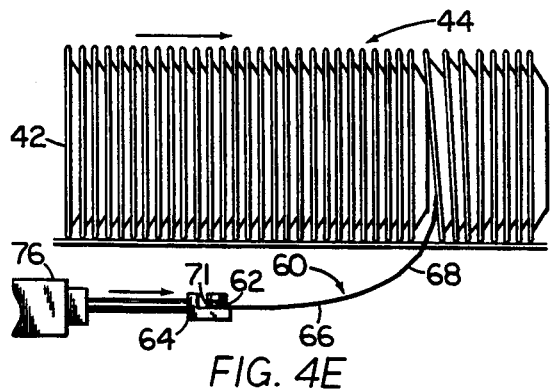
Figure 4F:
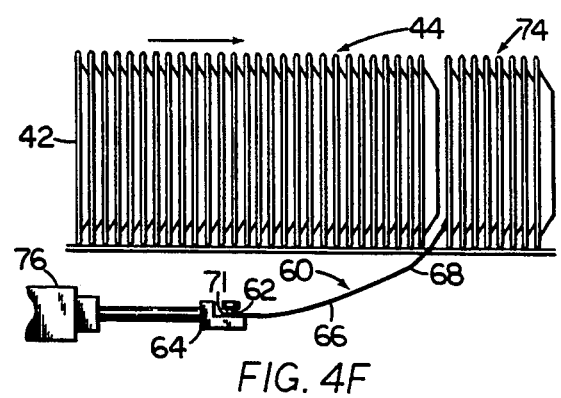
Figure 4G:
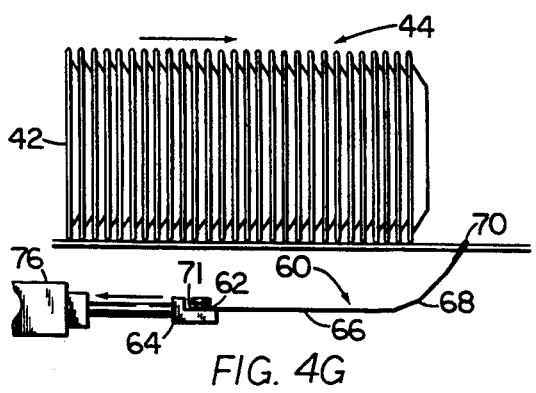
Figure 4H:
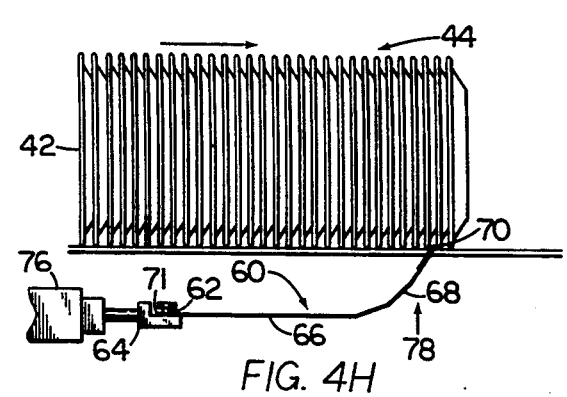
Figure 5A:
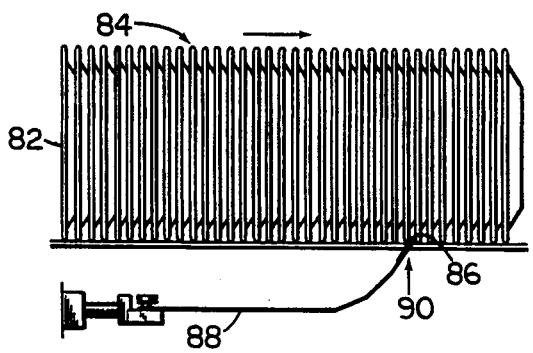
FIGS. 5A–5H are a series of partial side cross section views of an alternative preferred embodiment constructed in accordance with the present invention, illustrating in part the actions of the motive system.
Figure 5B:
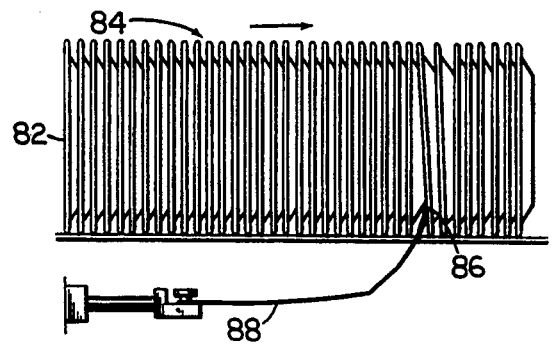
Figure 5C:
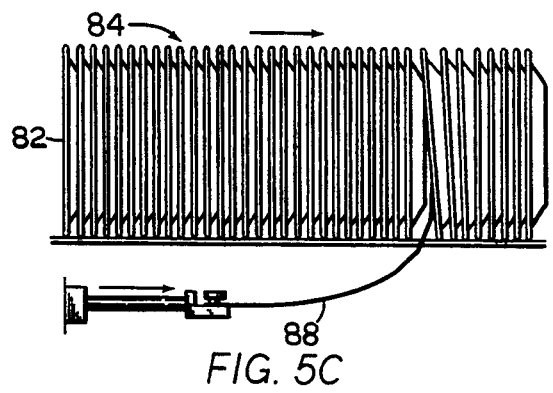
Figure 5D:
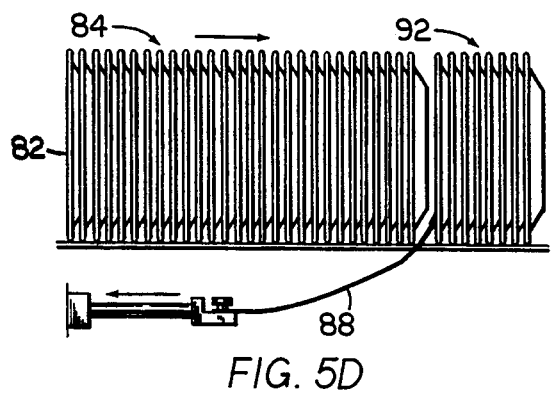
Figure 5E:
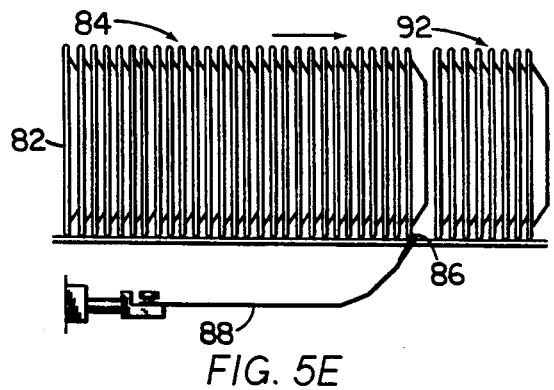
Figure 5F:
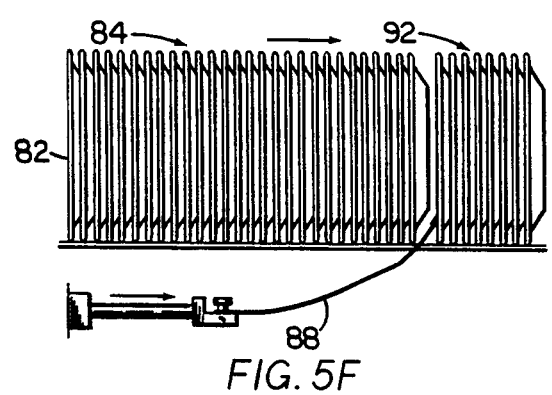
Figure 5G:
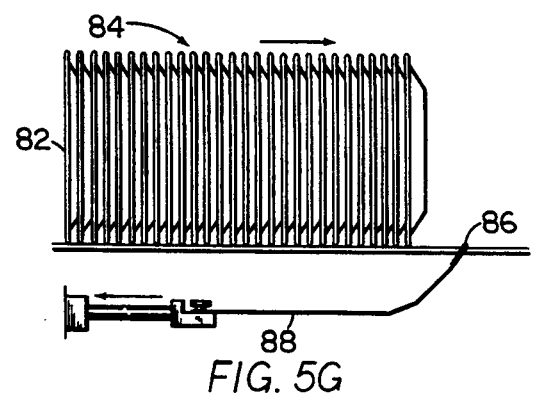
Figure 5H:
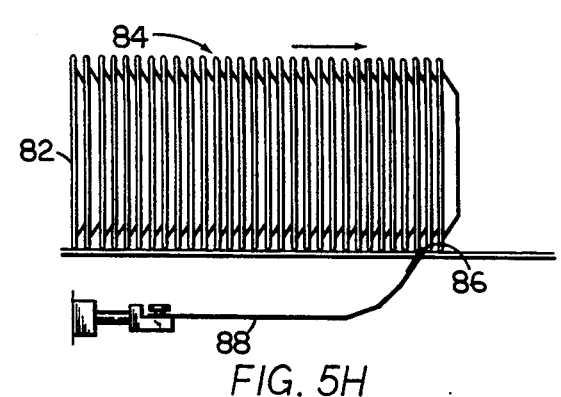

When the motive system is triggered by the counter device 56, the motivation bar and the attached fingers are moved forward. As shown in FIGS. 4A–4H, when the fingers are at rest at the reference position, the stacked products in each product line pass over the upper end of the finger, but the upper end of the finger does not extend far enough into the elongated channel to interrupt the stacked products' forward progress. As each finger moves forward, the upper end moves forward and at the same time when it "feels" a space between two of the stacked products in the product line, it will bend slightly and then also move upward into the space. This is best illustrated in FIGS. 4B–4C. As the motivation bar continues forward, the finger separates the predetermined number of stacked products, which now form the counted unit 74 and push the counted unit to the end of the elongated channel where the counted unit is then passed on to a packaging machine not shown, or some other device to dispose of the counted units as desired.

As can be seen from the above discussion, it is important that at least the curved section 68 of each finger 60 be flexible enough to keep the finger upper end 70 in contact with the stacked products 42 as they pass over it. The finger curved section also needs to be sufficiently flexible to allow it to bend upward and insert the upper end between the stacked product when it is moved forward by the motivation bar 64. At the same time the finger must be sufficiently strong to retain its shape as the finger pushes the counted unit 74 forward. Success has been achieved using strips of steel one inch (1") wide and approximately .015"thick. The steel strip is cut to the desired length and then bent or molded to the desired shape. Any material with sufficient flexibility and strength, such as polyvinyl chloride or fiberglass also could be used to construct the fingers.

Figure 8:
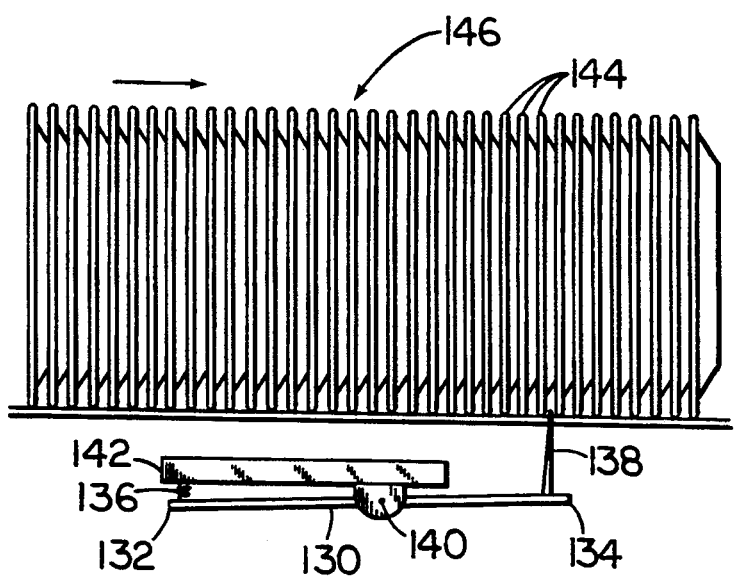
FIG. 8 is a perspective view of an alternative preferred embodiment of a finger constructed in accordance with the present invention.

An alternative preferred embodiment of a finger as a separator device is illustrated in FIG. 8. This finger has a rocker arm 130 with a first end 132 and a second end 134, a spring 136, a stylus 138, and a pivot 140. The rocker arm is pivotably attached to the motivation bar 142 by the pivot which attaches to the rocker arm at a point along its length. The spring is positioned between the motivation bar and the rocker arm at or near the rocker arm first end. The stylus at the rocker arm second end moves upward as the rocker arm pivots from the downward pressure applied to the rocker arm first end from the spring. As with the finger discussed above, the stylus presses against the products 144 in the product line 146. As the products pass over the stylus, the stylus dips slightly compressing the spring which in turn forces the stylus upward again into the next gap between the products. As with other fingers, when this finger is moved forward the stylus separates adjacent products creating a counted unit.

This preferred embodiment of the finger can be used with any of the embodiments of the present invention discussed herein. One particular application in which this rocker arm finger can be used is for heavier products or for vertically stacked product lines where greater strength is needed and the spring loaded stylus will keep its upward position against the products' edge in the product line.

Experimentation has shown that some stacked products have sufficient variation in size or their edges are sufficiently close together that simply moving the fingers forward one time does not always assure the guaranteed result. The preferred embodiment illustrated in FIGS. 5A–5H uses what could be best described as a "stutter-step" to overcome the difficulties in separating the stacked products into counted units.

The apparatus in this embodiment is identical to the apparatus in the above described preferred embodiment for the most part. There are stacked products 82 in a product line 84 which passes over the upper end 86 of the finger 88. In this embodiment, however, when the finger moves from its resting position 90 to separate the stacked products into a counted unit 92, the finger is moved forward only a relatively short distance. The finger is then returned to its resting position, which once again allows the curved section of the finger to relax.

Returning the finger to its resting position also leaves a slight gap between the first stacked product remaining in the product line and the last stacked product that is part of the newly created counted unit. As soon as the finger has been returned to its resting position, it once again is moved forward, which pushes the upper end of the finger against the last stacked product of the counted unit, bending the curved section and moving the counted unit forward for desired disposal. By moving the finger forward, back to its resting position, and then forward again to pause the separation process for a brief instant, problems with the fingers not seating well and failing to achieve desired separation have been virtually eliminated, even for difficult applications of handling stacked products in a product line.

Figure 6:
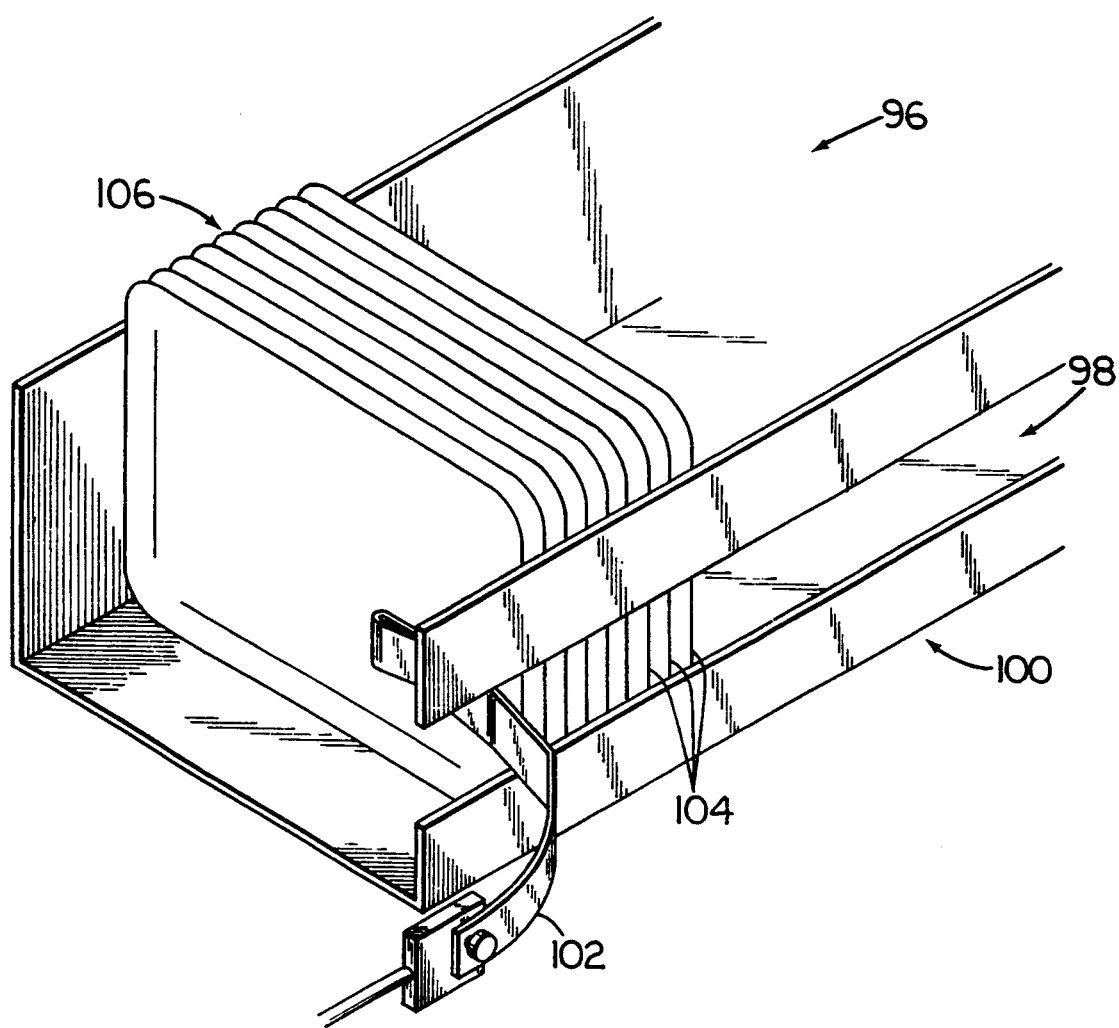
FIG. 6 is a perspective view of a second alternative preferred embodiment constructed in accordance with the present invention.

The above preferred embodiments of the present invention have single elongated slots 52 in the bottom 50 of the elongated channel 46. This configuration is not an essential feature of the present invention. The alternative preferred embodiment illustrated in FIG. 6 uses an elongated channel 96 with an elongated slot 98 that is located in the side 100 of the elongated channel. In this preferred embodiment, the finger 102 extends into the elongated channel through a slot in the channel side, but the action of the finger in separating the stacked products 104 into counted units 106 is virtually identical to that described above. This includes the use of the "stutter-step" process of separation for difficult application.

Figure 9:
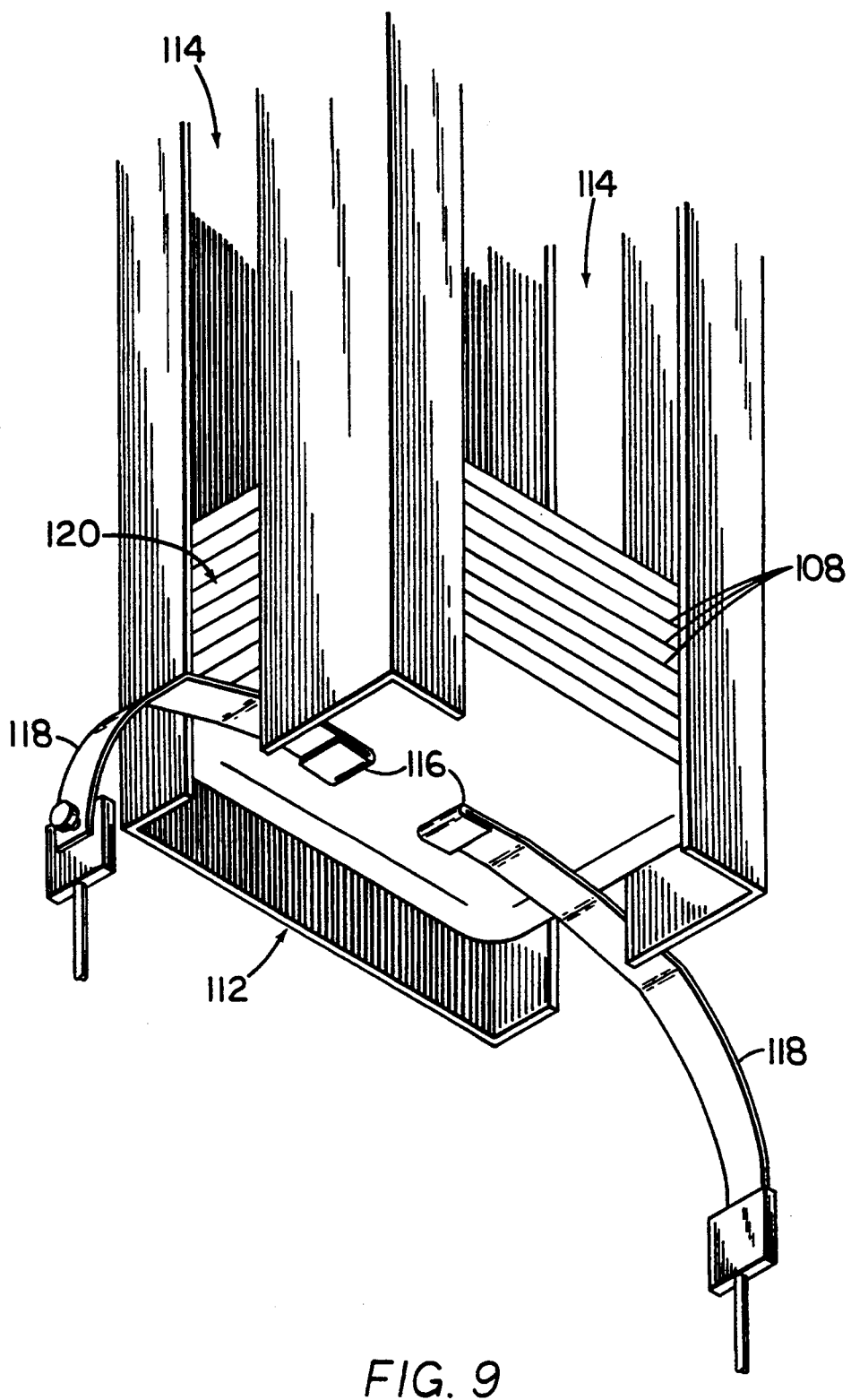
FIG. 9 is a perspective view of a third preferred embodiment constructed in accordance with the present invention.

The above preferred embodiments are configured for use with stacked products which are resting on their edges with a substantially vertical orientation in a product line that has a substantially horizontal orientation along its length. The handling apparatus and method of the present invention can also be used with product lines that are vertically oriented along their length, as shown in FIG. 9.

In this alternative preferred embodiment, stacked products 108 rest one on top of another to form a product line 110 that is substantially vertical in orientation. As in the above embodiments, this alternative preferred embodiment has at least one elongated channel 112 with elongated slots 114 through which the upper ends 116 of fingers 118 extend to contact the stacked product. This particular embodiment for vertically oriented product lines uses two fingers since this allows handling control to successfully separate the stacked products into counted units 120 of a predetermined number. More than two slots and corresponding fingers can be used in applications where the weight of products requires more strength and control from the separator devices.

The operation of the embodiment for vertical applications is virtually identical to the embodiments described above. Instead of moving forward to separate stacked products into counted units, the fingers in this embodiment move upward to create the counted units and dispose of them as desired. Other preferred embodiments of the present invention can be used with product lines having orientations between substantially horizontal and substantially vertical, such as a product line for some specialized application may need to be oriented at a 20 degree angle relative to the horizontal, although not shown.

Regardless of the embodiment of the present invention used, the count which is used to determine the number of products passing a fixed reference point always originates from the machine actually producing the stacked products. This count is always returned to zero (0) once the motive system is triggered to move the fingers forward. Further, the fingers used to separate the stacked products into counted units always move from the fixed reference point and always return to the fixed reference point. These two features result in a very accurate count of the stacked products contained in the counted unit with no accumulated error. When the above elements of the present invention are combined with the "stutter step" embodiment of the present invention, the accuracy of the count increases even further by eliminating problems with slippage or failure to seat properly.

Similarly, the use of the fingers with their curved sections and upper ends optimizes their ability to separate the stacked products at the desired point to create the counted units with a minimum problem of misfeeding or jamming. The result is counted units created by using the methods and apparatus in accordance with the present invention contained stacked products that vary from the desired predetermined number by one percent or less.

There are any number of applications for both the methods and apparatuses of the present invention. One successful application is in handling and counting No. 2 meat trays that are produced and output by an Irwin 50 Trim Press. The number of elongated channels that can be used ranges from one on up and is limited only by practical considerations as to size and the need to accommodate the output of the source of the stacked products. Similarly, as shown in some of the above embodiments, the number of fingers used to separate the stacked products can vary from one to as many as may be desired to control the stacked products as they are moved with two or more fingers coming through elongated slots in several sides or the bottom of elongated channels, may be desired, depending on the weight of the stacked products and the orientation of the product line.

INDUSTRIAL APPLICABILITY

This invention would be useful in any situation where it is desirable to be able to count, separate, and move products that are arranged in one or more product lines. This is especially true in situations where the products have proved difficult to count, separate and otherwise handle with existing methods and apparatuses.

In compliance with the statute, the invention has been described in a language more or less specific as to structural features. It is understood, however, that the invention is not limited to the specific features shown, since the means and construction herein disclosed comprise preferred forms of putting the invention to effect. The invention is, therefore, claimed in any of its forms or modifications within the legitimate and valid scope of the appended claims.

I claim:

1. A method for handling stacked products moving forward on a product line, comprising the steps of:
   counting stamping actions of a press machine as being indicative of a stacked product count as said stacked products move forward on the product line;
   accumulating said stacked product count of said stamping actions;
   inserting a separator device between two adjacent stacked products at a reference position after a predetermined number of stacked products have passed a fixed reference point;
   moving said separator device forward so as to separate said predetermined number of sucked products from other stacked products so as to create a counted unit according to said predetermined number of said stacked products; and
   returning said separator device to said fixed reference position.

2. The method of claim 1, further comprising the steps of:
   arranging said stacked products into a product line after said products have been produced; and
   feeding said product line into elongated channels to control said product line prior to said insertion of said separator device.

3. The method of claim 2, further comprising the steps of:
   stopping said separator device a short distance after moving it forward initially;
   returning said separator device to said fixed reference position; and
   moving said separator device forward again to separate said predetermined number of said stacked products from other products in said product line.

4. The method of claim 2, further comprising placing said product line in a horizontal orientation.

5. The method of claim 3, wherein said method further comprises placing said product line in a vertical orientation.

6. An apparatus for handling stacked products in a product line, said apparatus comprising:
   at least one elongated channel, each said elongated channel having sides, a bottom, and a length, said sides and said bottom being connected together to form said elongated channel, said channel having a width extending across said bottom and a height extending along said sides so that said stacked products can fit within said elongated channel;
   at least one elongated slot, each said elongated slot being located in and extending along said length of one said elongated channel, and each elongated channel having at least one elongated slot;
   a counter-separator system capable of separating a predetermined number of said stacked products from the product line;
   said counter-separator system comprising a counter device for counting said stacked products as said stacked products are being produced;
   a separator device; and
   a motive system, said motive system being operatively connected to said separator device and to said counter device so that when said counter device has counted a predetermined number of stamping actions of a press machine indicative of a number of stacked products moving through each said elongated channel past a fixed reference point, said motive system can move said separator device along said elongated channel to separate said predetermined number of said stacked products and push said predetermined number along each said elongated channel away from stacked products remaining in said product line to create a counted unit in each said elongated channel.

* * * * *

UNITED STATES PATENT AND TRADEMARK OFFICE
CERTIFICATE OF CORRECTION

PATENT NO. : 5,336,043
DATED : August 9, 1994
INVENTOR(S) : Bernard R. Bader

It is certified that error appears in the above-indentified patent and that said Letters Patent is hereby corrected as shown below:

At column 9, line 33: Replace "sucked" with --stacked--.

Signed and Sealed this

Eleventh Day of October, 1994

Attest:

BRUCE LEHMAN

*Attesting Officer*     *Commissioner of Patents and Trademarks*